(12) United States Patent
Shimizu et al.

(10) Patent No.: US 8,512,852 B2
(45) Date of Patent: Aug. 20, 2013

(54) POLYLACTIC ACID RESIN COMPOSITION AND FILM

(75) Inventors: Toshiyuki Shimizu, Shiga (JP); Toshifumi Unrinin, Shiga (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 85 days.

(21) Appl. No.: 13/321,891

(22) PCT Filed: May 12, 2010

(86) PCT No.: PCT/JP2010/058008
§ 371 (c)(1),
(2), (4) Date: Nov. 22, 2011

(87) PCT Pub. No.: WO2010/134454
PCT Pub. Date: Nov. 25, 2010

(65) Prior Publication Data
US 2012/0070679 A1    Mar. 22, 2012

(30) Foreign Application Priority Data
May 22, 2009 (JP) ................. 2009-123851

(51) Int. Cl.
*B32B 7/00* (2006.01)
*B32B 7/02* (2006.01)
*B32B 27/36* (2006.01)

(52) U.S. Cl.
USPC ........... 428/212; 428/213; 428/215; 428/216; 428/480

(58) Field of Classification Search
None
See application file for complete search history.

(56) References Cited

U.S. PATENT DOCUMENTS

| | | | |
|---|---|---|---|
| 6,770,356 B2 * | 8/2004 | O'Donnell et al. | 428/297.4 |
| 7,645,839 B2 * | 1/2010 | Bastioli et al. | 525/437 |
| 7,989,062 B2 * | 8/2011 | Chakravarty et al. | 428/373 |
| 8,003,122 B2 * | 8/2011 | Zhao | 424/423 |
| 8,029,909 B2 * | 10/2011 | Osada et al. | 428/480 |
| 8,053,062 B2 * | 11/2011 | Oya | 428/212 |
| 8,110,282 B2 * | 2/2012 | Osada et al. | 428/216 |
| 8,197,929 B2 * | 6/2012 | Watanabe et al. | 428/304.4 |
| 2007/0014977 A1 * | 1/2007 | Graney et al. | 428/212 |

FOREIGN PATENT DOCUMENTS

| | | | |
|---|---|---|---|
| JP | 2003-096285 | * | 4/2003 |
| JP | 2004-217289 | | 8/2004 |
| JP | 2004-358844 | | 12/2004 |
| JP | 2005-193438 | | 7/2005 |
| JP | 2007-100104 | | 4/2007 |
| JP | 2007-191625 | | 8/2007 |
| JP | 2008-063356 | | 3/2008 |
| JP | 2008-248184 | * | 10/2008 |
| JP | 2008-291268 | | 12/2008 |

OTHER PUBLICATIONS

He et al., "Unique crystallization behavior of poly(L-lactide)/poly(D-lactide) stereocomplex depending on initial melt states," Polymer 49:5670-5675 (2008).

* cited by examiner

Primary Examiner — Vivian Chen
(74) Attorney, Agent, or Firm — Fish & Richardson P.C.

(57) ABSTRACT

Provided is a polylactic acid resin composition useful as a molding material and a packaging material. The polylactic acid resin composition comprises a resin composition (l) comprising poly-L-lactic acid having an L-isomer content of 90-100 mol % as the main component and a resin composition (d) comprising poly-D-lactic acid having a D-isomer content of 90-100 mol % as the main component, the resin compositions (l) and (d) having been alternately stacked so that each layer has a thickness of 0.01-2.5 μm. The polylactic acid resin composition has specific thermal properties, can be used at high temperatures even after high-temperature melt molding, and can give molded polylactic acid articles having excellent suitability for various kinds of processing, such as printing, and having excellent transparency, etc. Also provided is a stretched polylactic acid resin film obtained by heating the polylactic acid resin composition to 280° C. or higher, subsequently cooling the composition, thereafter forming the polylactic acid resin composition into a film, and then stretching the film in at least one direction. This film can be used at high temperatures and has excellent suitability for various kinds of processing, excellent transparency, etc.

3 Claims, No Drawings

POLYLACTIC ACID RESIN COMPOSITION AND FILM

TECHNICAL FIELD

The present invention relates to a polylactic acid resin composition and a film thereof and provides a polylactic acid film that can be used at higher temperatures in comparison to a conventional polylactic acid film and that is superior in suitability for various processing such as printing, superior in transparency, etc., and useful not only as a wrapping material but also as an industrial material.

BACKGROUND ART

For keeping up with recent environmental problems, various types of materials have been studied. There are three strategies, i.e., (1) reduction in dependency on fossil resources, (2) biodegradability for reduction in environmental load, and (3) improvement in recyclability of materials and easy regeneration of resources. Polylactic acid has been studied continuously over 20 years as a material that is derived from a biomass and has biodegradability. It has started to be used for fibers, films, containers and molding materials, but slow crystallization rate, low strength, low heat resistance, low barrier property, and poorer balance between properties and price in comparison to general purpose petroleum resins have been pointed out as problems. In particular, improvement in properties, namely, heat resistance, solvent resistance and strength, is important and various studies are being made at present.

As a most-widely known technology for improving properties themselves of a resin, there is known a technology of forming a stereocomplex. A stereocomplex is a crystal in which a segment of a poly-L-lactic acid (hereinafter abbreviated as PLLA) and a segment of a poly-D-lactic acid (hereinafter abbreviated as PDLA) are packed in a one-to-one ratio and this can increase the melting point of PLLA alone or PDLA alone by about 50° C. In addition to that, it is known that mechanical properties, solvent resistance, and gas barrier property are improved by stereocomplex formation, and this is researched currently by many companies.

As to a method for producing a stereocomplex, it can be obtained by blending PLLA and PDLA, but there are the following problems with practical production as is apparent from prior art documents.

(1) When using a high molecular weight polylactic acid, which is advantageous in an aspect of mechanical properties, it is difficult to form a stereocomplex efficiently during the course of crystallization, and a large number of homocrystals of PLLA and PDLA, which are species to preferentially crystallize, and a small number of stereocomplex crystals are formed by merely blending. Therefore, originally intended improvement in heat resistance and so on becomes insufficient.

(2) Although it has been known that the efficiency of stereocomplex formation is improved by kneading in a molten state, degradation of a resin caused by heat and fall of the melting point of a stereocomplex PLA due to transesterification between PLLA and PDLA also occur and, therefore, an effect sufficient for the intended goal can not be obtained.

With respect to these points, converting PLLA and PDLA into a block polymer (patent document 1), improving the efficiency of stereocomplex formation by reducing the molecular weight of one polylactic acid resin (patent document 2), forming a stereocomplex efficiently in a state where the molecular weight is low, and then performing solid phase polymerization (patent document 3), copolymerizing another component to one polylactic acid in order to improve the compatibility with another polylactic acid (patent document 4), and performing heat treatment at a specified temperature for forming a stereocomplex (patent document 5) have been proposed for stereocomplex formation. However, these methods are all not on the precondition of using a general purpose polylactic acid but on the precondition of improving a resin itself, and, therefore, there are at present many problems to be solved for industrialization. Moreover, there have not been proposed any solutions for the problem that these methods are accompanied by a transesterification reaction in promoting stereocomplex formation or in melt-molding a resulting resin composition again, resulting in occurrence of fall of a melting point and so on.

Moreover, in the case of subjecting a general polyester resin or the like to processing such as drawing, it is general to heat it to a temperature equal to or higher than its melting point to once melt its crystals, rapidly cool the melt into an amorphous state, and process the amorphous within a temperature region of from the glass transition point to the melting point. By a method in which a stereocomplex polylactic acid is heated once to about 250° C., which is a temperature higher than the melting point (140 to 170° C.) of a polylactic acid resin, thereby melting crystals of the polylactic acid and followed by rapidly cooling the melt and the resulting molded article is subjected to drawing, rupture occurs due to fall of drawability caused by stereocomplex crystals in a step of drawing or the like, and a drawn film was not obtained probably because the stereocomplex crystals in the resin can not be melted completely. Then, it becomes possible to draw a molded article by heating a stereocomplex polylactic acid to a temperature of 280° C. or higher at which crystals of the stereocomplex polylactic acid can melt completely; however, the melting point of the resulting resin becomes a temperature that is far lower than the original melting point of a stereocomplex crystal. This is probably because it has been pointed out that a stereocomplex is difficult to be formed again depending upon the melting state of stereocomplex crystals which depends on the temperature, the melting time and the like at the time of melting (non-patent document 1) and if stereocomplex crystals are melted once, homocrystals of PLLA and PDLA, which are species to preferentially crystallize, are formed earlier. As described above, there is at present no method of industrially reconciling molding processability with efficiency of reformation of a stereocomplex polylactic acid crystal after remelting.

Among the methods described in the above-listed patent documents, a concrete production method is a method in which the preparation of a stereocomplex is carried out by casting film from a solution. However, this method is not suitable for industrial mass production, or there have been obtained only films resulting from pressing at temperatures as low as about 250° C., or the melting point has been lowered or a sufficient stereocomplex has not been obtained even in a product obtained by melting.

The above-described known technologies developed up to date are summarized as follows.

(i) A stereocomplex body is difficult to be formed by only melt-blending PLLA and PDLA. Moreover, a melting point falls due to a transesterification reaction if kneading PLLA and PDLA under melting in order to promote stereocomplex formation. Even if a stereocomplex is formed, the stereocomplex is easily divided into PLLA and PDLA by remelting to each form a stereo single crystal, and a complex is hardly formed again.

(ii) Reformation of a stereocomplex in remelting is promoted by methods such as block polymerization and reduction in the molecular weight of one resin, but the fall of melting point due to a transesterification reaction can not be suppressed.

PRIOR ART DOCUMENTS

Patent Documents

Patent document 1: JP 2007-100104 A
Patent document 2: JP 2003-96285 A
Patent document 3: JP 2008-291268 A
Patent document 4: JP 2007-191625 A
Patent document 5: JP 2008-63356 A Non-Patent Document Non-patent document 1: Y. He et al./Polymer 49 (2008) 5670-5675 "Unique crystallization behavior of poly(L-lactide)/poly(D-lactide) stereocomplex depending on initial melt states"

SUMMARY OF THE INVENTION

Problems to be Solved by the Invention

The present invention intends to provide a polylactic acid resin composition useful as a molding material or a wrapping material, which composition can reform stereocomplex PLA more easily in comparison to a conventional composition even when producing a molded article by melt-molding at a high temperature and can afford a polylactic acid molded article the fall of the melting point of which caused by a transesterification reaction in remelting is suppressed. Moreover, it intends to provide a polylactic acid film that can be used at high temperatures and is superior in suitability for various processing and in transparency.

Solutions to the Problems

The present inventors researched earnestly in order to solve the above-mentioned problems, and have accomplished the present invention. The present inventors have found that it is possible to form a stereocomplex efficiently by thinly dividing a layer of a PLLA melt and a layer of a PDLA layer, stacking many of such divided layers alternately to make the contact area of both resins large, and heating them. Moreover, they have found that the resulting polylactic acid has a high melting point and has a very high efficiency of reforming stereocomplex crystals even after melting at a conventionally-unexpected high temperature of 280° C., and when the resulting polylactic acid is used for various types of melt-molding, it can afford polylactic acid molded articles having various new superior properties. Thus, the present invention has been accomplished.

That is, the present invention is constituted as follows.
1. A polylactic acid resin composition, comprising a resin composition (l) primarily including a poly-L-lactic acid having an L-form content of 90 to 100 mol % and a resin composition (d) primarily including a poly-D-lactic acid having a D-form content of 90 to 100 mol %, the resin compositions (l) and (d) being stacked alternately one on another with (l) and (d) each being 0.01 to 2.5 μm in a single layer thickness, wherein a peak of a melting point is observed at 210° C. or higher in DSC measurement using a 10 mg sample, and an enthalpy of fusion is measured to be 60 J/g or more when the sample is heated to 280° C., held for 3 minutes, then immediately cooled rapidly, and further subjected to DSC measurement at a temperature raising rate of 20° C. per minute.
2. The polylactic acid resin composition according to 1, wherein the resin composition (l) and the resin composition (d) are stacked alternately one on another by making them pass a static mixer or a multilayer feed block.
3. A polylactic acid resin drawn film produced by using the polylactic acid resin composition according to 1 or 2, heating it to 280° C. or higher, then cooling it rapidly, and then drawing it in at least one direction.

Effects of the Invention

The present invention is a polylactic acid resin composition that is high in melting point even after it is heated to 280° C. and melt-molded and that can maintain a high stereocomplex formation efficiency after molding process; molded articles thereof exhibit not only superior heat resistance but also various properties as stereocomplex molded articles, such as superior mechanical properties, solvent resistance, and gas barrier property. In particular, when it is processed into a film, a film that particularly has various superior processing suitabilities derived from superior transparency and high heat resistance with a print pitch error suppressed is produced. In the method of the present invention, it is preferred to form stereocomplex PLLA and PDLA after dividing them each into thin layers. By the use of this method, the time for mixing PLLA with PDLA in a molten state for stereocomplex formation becomes shorter than usual. It is conceivable that the above reduces the fall of the optical purities of the respective polylactic acid resins, and the fall of a melting point is reduced and a polylactic acid that exhibits the aforementioned superior properties can be obtained by a simple process and a simple apparatus.

Although the fact that the efficiency of reforming stereocomplex crystals is very high even after melting at a high temperature of 280° C., which is one feature of the present invention, is under consideration, it is conceivable that by stacking PLLA and PDLA in layers, a stereocomplex is formed at their interface, and since even after the stereocomplex is divided into PLLA and PDLA after remelting, these resins are arranged next to each other in layers, the contact area of the resins is sufficiently large, single crystals of PLLA and PDLA are difficult to form, and, therefore, a stereocomplex is easily formed. It seems that a transesterification reaction is suppressed and the fall of the melting point of a stereocomplex is suppressed because a stereocomplex is reformed easily and, therefore, excessive heating and so on are not needed.

MODE(S) FOR CARRYING OUT THE INVENTION

In the following, the present invention is described in detail.

(Polylactic Acid Resin)

The polylactic acid resin to be used in the present invention essentially includes a poly-L-lactic acid resin (l) having an L-form content of 90 to 100% and a poly-D-lactic acid resin (d) having a D-form content of 90 to 100%. These resins can be obtained easily by melt ring opening polymerization from lactide, a raw material, as well as by using commercially available products. As a commercially available polylactic acid resin, Nature Works, which is an L-form polymer produced by Nature Works, REVODE produced by Hisun Biomaterials Co., Ltd., Lacea, which is an L-form polymer produced by Mitsui Chemicals, Inc., and a polylactic acid resin produced by Purac can be used, and a polymer can be obtained from raw materials using lactides produced by Musashino Chemical Laboratory, Ltd. or Purac.

As to the molecular weight of the polylactic acid resin to be used in the present invention, it is preferred that the polystyrene-equivalent weight average molecular weight of the above-mentioned (l) or (d) be within the range of from 100,000 to 300,000, more preferably from 100,000 to 250,000, and even more preferably from 100,000 to 200,000. The case that both (l) and (d) are less than 100,000 is undesirable because if so, the resin becomes very brittle. The case that both (l) and (d) exceed 300,000 is undesirable because if so, the melt viscosity becomes so high that processability such as melt-moldability deteriorates.

As to the thermal properties of the PLLA and the PDLA to be used in the present invention, their glass transition temperature is preferably within the range of from 40 to 70° C. If it is lower than 40° C., the optical purity is low, which is not very preferable for stereocomplex formation. The melting point is preferably within the range of from 120 to 170° C. If it is lower than 120° C., the optical purity is low, which is not very preferable for stereocomplex formation.

To the layers primarily containing (l) and (d), respectively, may be added various additives such as a lubricant, an antistatic agent, a concealability imparting agent, a melt viscosity increase agent, an adhesiveness imparting agent, a barrier property imparting agent, an antioxidant, a thermal stability imparting agent, a plasticizer, and a crystal nucleating agent. Concretely, while silica, alumina, zirconia, magnesia, titania, salts of alkylsulfonic acids, polyfunctional isocyanates, polyfunctional carbodiimide compounds, polyfunctional epoxy compounds, aliphatic and aromatic polyester resins, polyurethane resins, polycarbonate resins, acrylic resins, vinyl resins, low molecular weight barrier property imparting agents, polyglycolic acid, antioxidants, such as Irganox1010 (available from Ciba Japan), polyglycerols, polymerization catalyst deactivators such as phosphorus-containing compounds, and so on can be listed, any substance other than inorganic compounds must be 200° C. or lower in melting point. The case that the melting point exceeds 200° C. is undesirable because such a resin does not melt during the course of melting a polylactic acid resin, causing defective appearance. The amount to be added of these additives, which is adjusted appropriately for developing desired properties, is preferably within the range of from 0 to 10% by weight. The case that it exceeds 10% by weight is undesirable because if so, various properties deteriorate and stereocomplex formation is inhibited.

(Division and Stacking of Layers)

The most preferable method for obtaining a stereocomplex resin in the present invention is described below.

In order to obtain such a stereocomplex resin, many layers of resin layers (L) and (D) made of PLLA or PDLA are stacked. As to a stacking method, a product can be obtained by a method including laminating resin sheets each composed of a resin layer (L) and a resin layer (D) and heating and rolling them, and a static mixer method or a multilayer feed block method can be used. From an economic aspect, the latter methods, i.e., the static mixer method, the feed block method, or a combination of both is preferred.

In the case of laminating sheets and heating and rolling them, the sheets before heating and rolling can be produced by ordinary methods, and concrete examples of such methods include a melt-extrusion method, a melt-pressing method, a calendering method, and a solution casting method. In the melt-extrusion method, the melting temperature is preferably within the range of from 160 to 250° C. and more preferably within the range of from 170 to 240° C. That the melting temperature is lower than 160° C. is undesirable because if so, the melt viscosity is excessively high. That it is 250° C. or higher is undesirable because if so, thermal decomposition of a polylactic acid resin or the like may occur. In solution casting, any solvent in which a polylactic acid resin can be dissolved is not particularly restricted. From the viewpoint of productivity, solvents having a boiling point of from 20 to 200° C. are preferred, and examples thereof include chloroform and tetrachloromethane. Since the solution casting method allows a solvent to remain and, therefore, its application may be restricted, methods failing to include any solvent, such as the melting method and the calendering method, are preferred. The thickness of a sheet before laminating is preferably within the range of form 0.1 to 100 µm, and more preferably within the range of from 1 to 10 µm. If it is 0.1 µm or less, handling becomes difficult due to wrinkling, and so on. The case of being 100 µm or more is undesirable because if so, the overall thickness becomes excessively large in laminating into multiple layers, resulting in poor economical efficiency. As to the resulting sheet, sheets of PLLA and sheets of PDLA are laminated alternately, followed by raising the temperature of the sheets to their melting points or higher by heating, and then rolled. The thickness of the sheet before rolling and the number of layers to be laminated at the time of rolling are preferably determined in consideration of the thickness of a layer at the time of performing stereocomplex formation and the thickness of a sheet after rolling. The thickness after rolling is preferably within the range of from 1 to 1000 µm. In one concrete example, five 100-µm thick sheets of PLLA and five 100-µm thick sheets of PDLA are prepared, and these are rolled with a pressing machine or the like at 180° C. with the sheets laminated alternately, thereby forming a 100-µm thick sheet. In a similar way, ten rolled sheets in total are produced and the ten sheets are laminated and rolled in a similar way except for adjusting the temperature to 220° C. Thereby a laminated sheet having a layer thickness of 1 µm can be produced. When subjecting the resulting sheet to processing such as drawing during the following process, it is conceivable that a sheet in a state like a stereocomplex precursor that contains only a small amount of stereocomplex crystals but can form a stereocomplex easily by heating can be obtained by adjusting the pressing temperature in a final pressing step to 260° C. or higher, preferably 270° C. or higher, more preferably 275° C. or higher, and particularly preferably 280° C. or higher, and then cooling the sheet rapidly. Although the reason for this is unknown, the fact that crystals of PLLA and PDLA, which are easily formed by nature, are prevented from being formed structurally due to PLLA and PDLA being stacked in a thickness direction is presumed to cause that. The upper limit of the pressing temperature is preferably 350° C., and more preferably 330° C. or lower. That it exceeds 350° C. is undesirable because if so, thermal degradation such as decomposition easily occurs. Rapid cooling in the present invention refers to cool a melt while maintaining its degree of crystallinity at 30% or lower during cooling the melt to a temperature equal to or lower than its glass transition temperature, and concrete examples thereof include, but are not limited to, performing cooling at a cooling rate of 200° C./min or more by immersion into liquid nitrogen or pressure bonding onto a cooling roll.

Similar preparation can be done by using a static mixer or a multilayer feed block. Concretely, PLLA and PDLA are fed to two extruders to melt, and then a long sheet with a multilayer structure in which PLLA and PDLA are stacked alternately is produced easily in a short time by using a static mixer or a multilayer feed block. Advantages of these methods include that a long sheet can be obtained, that it is easy to control the weight ratio of the resins, and that the melting point is less lowered in comparison to ordinary blending. With regard to this, when pellets of ordinary PLLA and PDLA are blended and fed to an extruder, a transesterification reaction occurs and a phenomenon that the melting point of the resulting stereocomplex falls is observed. Particularly, this phenomenon is observed when fully performing kneading in a molten state in order to improve the efficiency of stereocomplex formation, and the improvement in the efficiency of stereocomplex formation and the fall of the melting point of the resulting stereocomplex body are in a tradeoff relationship. On the other hand, in the case of stereocomplex formation in multilayering, PLLA and PDLA are brought into contact with each other in a high surface area for a short time and, therefore, the transesterification reaction of both the resins is minimized.

The resin compositions constituting the polylactic acid resins (l) and (d) (if necessary, other additives) are each fed to separate extruders and extruded at temperatures equal to or higher than their melting temperatures. Concretely, the range of from 140 to 250° C. is preferred. The melting temperature is preferably up to a temperature 5° C. lower than the decomposition onset temperature. In particular, polylactic acid is liable to decomposition at 250° C. or higher and, therefore, it is necessary to pay attention.

In the present invention, it is preferred that the aforementioned two melts be divided respectively into layers having a thickness of 0.01 to 2.5 μm by using a static mixer or a multilayer feed block and then the layers be stacked one on another alternately. It is important, from the viewpoint of increasing stereocomplex formation efficiency, to divide layers for increasing the contact area of both the resins. The thickness of a layer to be formed by division is preferably 0.02 to 2 μm, and more preferably 0.02 to 1 μm. An attempt to make the layer thinner than 0.01 μm is undesirable because this is substantially equivalent to that PLLA and PDLA are melt-mixed and the melting point of a stereocomplex falls. That the layer is thicker than 2.5 μm is undesirable because the stereocomplex formation efficiency is poor and crystals of only PLLA and only PDLA are easily formed.

As to the resin layers one of which primarily contains the polylactic acid resin (L) and the other primarily contains the polylactic acid (d), the melting temperature difference at the time of their lamination is preferably 0 to 30° C., more preferably 0 to 20° C., and even more preferably 0 to 10° C. When the melt viscosity difference in stacking layers is up to 30 times, preferably up to 20 times, and more preferably up to 10 times expressed by a shear rate estimated in a die, it becomes possible to suppress unevenness of appearance at the time of stacking layers. In controlling the melt viscosity, the aforementioned multifunctional compounds can be added. The feed block temperature is preferably within the range of from 160 to 300° C., more preferably from 170 to 290° C., and even more preferably from 180 to 280° C. When the feed block temperature is low, the melt viscosity becomes excessively high and, therefore, the load applied to the extruder becomes excessively high, whereas that the temperature is high is undesirable in an aspect of stereocomplex formation because if so, the melt viscosity difference becomes large and, therefore, unevenness or the like occurs.

The polylactic acid resin of the present invention is preferably subjected to heat treatment after being stacked by the above-described method. In this case, it is possible to heat a part of later stage elements of a static mixer, or extend a melt line after stacking layers by a feed block system and then perform heat treatment in a part or the whole part of the melt line, or perform heat treatment in a part extending from a feed block to a die. The temperature of the heat treatment is preferably within the range of from 230 to 300° C., more preferably from 235 to 295° C., and even more preferably from 235 to 290° C. In a state of having been extruded through a die, the smaller the content of stereocomplex crystals, the better it is. This can be confirmed by using DSC from the amount of enthalpy of fusion of a stereocomplex crystal. Preferably, the resulting stacked body is pelletized and then subjected to dry and crystallization. That is, it can be said that one desirable embodiment of the polylactic acid composition of the present invention is a pellet form. Moreover, performing various types of molding directly without doing cooling, and forming a film in a manner described later after rapidly cooling and casting by a T-shaped die method are included in preferred embodiments.

In the production of the polylactic acid of the present invention, to increase the contact area of molten poly-L-lactic acid and molten poly-D-lactic acid rapidly without providing stirring as strong as transesterification occurs is efficient for increasing the stereocomplex formation efficiency.

Some of preferred production methods for the aforementioned purpose are as follows.

(1) A method in which polylactic acid resins (l) and (d) are brought into contact with each other efficiently by stacking molten polylactic acid resins (l) and (d) in two layers and repeating division and alternate stacking of them.

(2) A method in which melts in which molten polylactic acid resins (l) and (d) are bundled in a thin thread form are stacked as described above by using a die having such a structure that molten polylactic acid resins (l) and (d) are extruded separately through many small holes and the small holes through which the polylactic acids (l) and (d) are extruded are combined alternately.

(3) A method in which a melt composed of the molten polylactic acids (l) and (d) described in the above (2) bundled into a thin thread form is introduced into a thinning tube, thereby drawing it.

(4) A method in which polylactic acids (l) and (d) processed into a fibrous form are mixed to bundle, and this is melted without stirring to stack or draw as described above.

(5) A method in which polylactic acids (l) and (d) are pulverized separately and dry-blended, and this is melted without stirring to stack or draw as described above.

The features of the stereocomplex polylactic acid of the present invention include that the stereocomplex body is stable even after remelting it to a melting point 230° C. or higher and it hardly returns to a blend of original PLLA and PDLA. Concretely, one feature is that the enthalpy of fusion measured at a temperature raising rate of 20° C./min in DSC is 60 J/g or more after heating the resulting stereocomplex body again to 280° C., holding it for 3 minutes, and then cooling it rapidly. For achieving such a feature, it is preferred to adjust the thickness of each layer within the range of from 0.01 to 2.5 μm.

The ratio of the thickness of the layer made of the resin (l) to the thickness of the layer made of (d) in the present invention is preferably from 70/30 to 30/70, and more preferably from 60/40 to 40/60. That one of the layers is thinner than 30% is undesirable because if so, an effect for improvement in heat resistance, which is an object of the present invention, is decreased.

(Glass Transition Temperature, Melting Point, Crystal Enthalpy of Fusion)

It is preferred that the polylactic acid resin composition of the present invention have a peak temperature of its melting point within the range of from 210 to 240° C. in measurement using a scanning differential calorimeter. That it is lower than 210° C. is undesirable for the object of the present invention, the object of which is to improve heat resistance. It is more preferably 215° C. or higher, particularly preferably 220° C. or higher, and most preferably 225° C. or higher. Causes of the occurrence of the case that the peak temperature of the melting point is lower than 210° C. include thermal degradation of the polylactic acid resin and melting point lowering caused by transesterification, and it is preferred to minimize the thermal hysteresis during the process. In addition, it is preferred that the enthalpy of fusion of an absorption with a peak at 210 to 240° C. observed at a temperature raising rate of 20° C. per minute after rapidly cooling immediately after raising the temperature to 280° C. and maintaining the temperature for 3 minutes be 60 J/g or more. That the enthalpy of fusion is less than 60 J/g is undesirable for the present invention whose object is to improve heat resistance because the stereocomplex formation efficiency is low. The enthalpy of fusion is preferably 65 J/g or more and more preferably 70 J/g or more. Moreover, it is preferred that also an absorption observed at a temperature raising rate of 20° C. per minute after rapidly cooling immediately after raising the temperature to 280° C. and maintaining the temperature for 3 minutes have a peak at 215° C. or higher, particularly at 220° C. or higher. The melting point may be 250° C. at most; an effect in heat resistance will be only saturated even if the melting temperature exceeds this value. The enthalpy of fusion may be 80 J/g at most; an effect in stereocomplex crystal formation efficiency will be only saturated even if the enthalpy of fusion exceeds this value. Also when producing a drawn film, raising its temperature to 280° C. and then rapidly cooling it, and measuring the amount of enthalpy of fusion, the below described method for measuring "the amount of enthalpy of fusion ($\Delta$Hm) after heating to 280° C. and then cooling rapidly" can be carried out and data can be collated.

The information about the PLLA and the PDLA to be used is as described above.

(Sheet)

The polylactic acid resin composition of the present invention is used suitably for a sheet. As to processing into a sheet, the sheet can be obtained by subjecting sheets of PLLA and sheets of PDLA to multilayer stacking and rolling by the above-described methods, and it is also possible to directly convert a material multilayered by using a static mixer or a multilayer feed block into a sheet by using a T-shaped die or the like. Moreover, it is preferred in the present invention that it is possible to remelt pellets prepared by repelletizing a multilayered strand-shaped or sheet-shaped resin and then form a sheet. Although the casting method to be used in the case of directly forming a sheet is the same as ordinary methods for forming a sheet, it is preferred to directly extrude a material melt-stacked as described above and then form a sheet by bringing the material into contact firmly with a chill roll adjusted to 20 to 60° C. Although the lower the chill roll temperature, the more preferred, the chill roll temperature is preferably within the range of from 30 to 60° C. in order to suppress development of pollution with time due to deposition of an oligomer. Since the crystal size is prevented from becoming large due to multilayering in the present invention even in casting by slow cooling, that only a small influence is given on the fall of drawability is one of the features of the present invention. The thickness of the sheet is preferably within the range of from 10 to 1000 μm.

The aforementioned thermally treated melt is cast with a T-shaped die or the like. The die temperature is within the range of from 220 to 300° C., preferably from 230 to 290° C., more preferably from 240 to 280° C. If the temperature becomes excessively low, the melt viscosity will become excessively high and, therefore, roughness on a surface or the like will occur, so that the appearance will deteriorate. That the temperature becomes excessively high is undesirable because if so, thermal decomposition or fall of melting point of the polylactic acid resin occurs. As to causes of rupture that occurs in drawing when obtaining a drawn film from a cast sheet, that crystals of a stereocomplex formed when stacking layers do not melt completely during heat treatment and some of them remain is conceived to be one of the causes. In this case, it is preferred to raise the temperature of the heat treatment. Also in producing a molded article other than a film, a problem may arise due to occurrence of sinking or the like if crystals remain during melting. Also in such a case, it is preferred to raise the temperature of the heat treatment.

The haze of a sheet obtained from the polylactic acid resin of the present invention is preferably within the range of from 0.1 to 50%. That it exceeds 50% is undesirable because if so, applications are restricted due to low transparency.

(Drawn Film)

The polylactic acid resin composition of the present invention, which can be used also in an undrawn state without being drawn as described above, is preferably drawn from the viewpoint of mechanical properties and it is used suitably for drawn film applications. As a drawing method, a method by blown film production can be used as well as sequential biaxial drawing or simultaneous biaxial drawing of the above-described extruded sheet.

As to processing into a drawn film, it can be obtained by bringing a material into contact firmly with a chill roll having a surface temperature of 10 to 50° C. by electrostatic contact system or touch roll system by melt-extrusion using the method disclosed in the foregoing section of sheet formation, thereby cooling it rapidly, and then biaxially drawing it.

In the case of subsequent biaxial drawing, the first stage drawing temperature preferred in the present invention is within the range of from 70 to 120° C., and more preferably within the range of from 75 to 110° C. If it is lower than the range provided above, it is difficult to perform drawing, whereas if it exceeds the range, it becomes difficult to perform drawing due to occurrence of crystallization. The first stage drawing may be carried out either at one time or in several times.

The second stage drawing means drawing in a direction perpendicular to the first stage drawing. In the second stage drawing, while the drawing ratio is preferably 3 to 8 times, it is determined in view of balance with mechanical properties in balance with the first stage drawing and it is not particularly limited.

In the case of simultaneous biaxial drawing, the drawing temperature preferred in the present invention is within the range of from 70 to 120° C. If it is lower than 70° C., it is difficult to perform drawing, whereas that it exceeds 120° C. is undesirable because if so, crystallization occurs. The drawing ratio is preferably within the range of 2 to 8 times, expressed in area.

Heat setting is performed after drawing and it is preferably carried out within the range of from 140 to 220° C. If the temperature is lower than 140° C., the thermal crystallization efficiency is low, whereas that the temperature exceeds 220° C. is undesirable because if so, a film will melt, resulting in high unevenness in thickness.

Relaxation is carried out after heat setting, and the relaxation ratio is preferably within the range of from 0.5 to 10%. The heat shrinkage of a resulting drawn film is preferably within the range of from 0 to 5% after a heat treatment of 150°

C.×30 minutes. That it exceeds 5% is undesirable for the present invention which intends to improve heat resistance, and that is also undesirable because dimensional error is caused in various processing steps such as printing and the occurrence of wrinkle or the like along with shrinkage is caused.

The thickness of a resulting drawn film, which is not particularly limited, is from 3 to 300 μm, preferably from 4 to 250, and more preferably from 5 to 200 μm. A film of 3 μm or less in thickness is undesirable for use in intended applications due to insufficient stiffness or strength of the film itself. That the film is thicker than 200 μm is undesirable because of poor productivity. The thickness of a film is determined from the thickness of an extruded film and the drawing ratio of the following drawing, and it is preferred to set the aforementioned conditions in view of the final thickness.

Although the transparency of the film of the present invention can be determined by haze measurement or the like, the haze is preferably within the range of from 0.05 to 20% when transparency is needed or the haze is preferably 80% or more when hiding ability is required. The haze value, which depends on a haze value inherent to the resin constituting the film, the types of additives and their amounts added, is usually determined according to the amount of a lubricant for imparting slipping ability to the film, and that the haze is less than 0.05% is undesirable because if so, the amount of the lubricant is so small that the slipping ability of the film is insufficient. That the haze is 20% or more is undesirable because if so, contents are difficult to be seen when the film is used as a wrapping material. In use for applications like synthetic paper, that the haze is lower than 80% is undesirable because if so, contents are undesirably seen well due to low hiding ability.

The unevenness in thickness of a resulting drawn film is preferably within the range of from 0 to 10% in the longitudinal direction and the transverse direction. That it exceeds 10% is undesirable because if so, the appearance of a wound-up roll is poor or unevenness occurs in printing. In order to reduce unevenness in thickness, it is preferred to adjust the drawing stress during drawing or tension at the time of heat treatment and, concretely, it is attained by appropriately adjusting the temperature or the drawing rate at the time of drawing and the temperature at the time of heat setting.

Although the strength of the film of the present invention varies depending upon measurement conditions and is represented by a value measured at an original sample length of 40 mm and a speed of a crosshead portion of 200 mm/min by using a tensile tester, the elastic modulus is preferably at least 2 GPa. That it is less than 2 GPa is undesirable because if so, the film becomes easy to stretch during various types of processing such as printing. Moreover, the upper limit is preferably 5 GPa. That it exceeds 5 GPa is undesirable in respect of productivity.

The elongation at break is preferably 10% or more, and more preferably 20% or more. If the elongation at break is less than 10%, productivity may fall due to frequent occurrence of rupture during film formation or various types of processing or difficulty may arise in handling. The upper limit is preferably 300%, and more preferably 150% or less. That it exceeds 300% is conversely undesirable because if so, the film becomes easy to stretch.

Such a film high in strength and high in degree of elongation can not be obtained until a stereocomplex is formed sufficiently and is drawn sufficiently by the methods described previously. The strength and degree of elongation within the aforementioned ranges can be adjusted by drawing conditions such as drawing ratio, introduction of a small amount of copolymerization to the polylactic acid (l) and the polylactic acid (d), and so on.

As to the slipping ability of the film of the present invention, it is preferred that both a coefficient of dynamic friction and a coefficient of static friction be from 0.2 to 1.0. That the coefficients are less than 0.2 is undesirable because if so, the film is very easy to slip and, therefore, winding slide of a film roll or the like easily occurs. That the coefficients exceed 1.0 is undesirable because if so, it becomes difficult to wind up the film into a film roll and generation of wrinkles or the like caused by poor slipping ability become noticeable. In order to impart such slipping ability, besides the addition of a lubricant to a resin, there can be used methods such as laminating a lubricant-containing layer on at least one side as a surface layer or forming a coat layer containing a lubricant on a surface. Particularly, a method of laminating a layer containing a lubricant as only a surface layer is the most preferable method in respect of compatibility of transparency with slipping ability, and especially laminating of a coat layer by an in-line coating method is most preferred. In this case, a cast sheet is uniaxially drawn and then is applied to a substrate film before crystal orientation is completed. Examples of the applying method include a reverse roll coating method, a gravure coating method, a kiss coating method, a roll brushing method, a spray coating method, an air knife coating method, a wirebar bar coating method, a pipe doctor method, an immersion coating method, and a curtain coating method, and these methods can be conducted alone or in combination.

The solid concentration of the coating liquid is usually 30% by mass or less, and preferably is 10% by mass or less. That the concentration is 30% by mass or more is undesirable because if so, the viscosity is high and it is difficult to do uniform application. The applied amount of the coating liquid, expressed in solid content, is from 0.005 to 5 g/m$^2$ and preferably is from 0.02 to 0.5 g/m$^2$. That the applied amount becomes 0.005 g/m$^2$ or less is undesirable because if so, a lubricant comes off or sufficient adhesion strength to an adhesion improving layer is not obtained. If it becomes 5 g/m$^2$ or more, blocking occurs and, therefore, there is a problem in practical use.

The film on which the coating liquid is applied is introduced to a tenter for drawing and heat setting and is heated to form a stable coating, so that a polyester-based laminated film is formed. The degree of cleanness at the time of applying a coating liquid is preferably class 1000 or less in order to reduce adhesion of dust.

The film of the present invention is subjected to various types of processing, examples of which include printing, lamination of a sealant, and sealing. In many cases in printing or sealant lamination, a film receives tension in its longitudinal direction and heat, so that it is brought into a condition where elongation or wrinkles are easily produced. Since local elongation and wrinkles or the like caused by the local elongation will occur when the slipping ability of a film is poor, it is preferred that the slipping ability of a film be sufficiently high, and it is preferred that a coefficient of static friction and a coefficient of dynamic friction be 0.4 or less. Since heat and tension are applied at the time of processing and, as a result, a film is undesirably stretched, the elastic modulus is preferably within the range of from 2 to 5 GPa. If it is less than 2 GPa, the film becomes easy to stretch, whereas productivity decreases in the production performed under a condition exceeding 5 GPa. Moreover, since a high heat shrinkage will cause generation of wrinkles, the heat shrinkage at 120° C. for 5 minutes is preferably 10% or less.

In order to make the film of the present invention be superior in printability, besides treatment such as corona treatment, an easily printable layer can further be laminated by a method such as in-line coating or off-line coating. The coated amount is preferably within the range of from 0.005 to 5 g/m². Since the film of the present invention is high in resistance to solvents because of its constitution, various solvents can be used, but application conditions should be determined in consideration of the kind of solvent, temperature, and tension in order to minimize the influence on various properties due to the heat and the tension to be applied to the film. The concrete solvent includes solvents having a boiling point of 200° C. or lower, and concretely, water, alcohols, ketones, esters, aromatics, hydrocarbons, chlorine-containing solvents, and so on can be used; the drying temperature is 200° C. or lower, and preferably is 180° C. or lower.

The film of the present invention is superior in slipping ability because it essentially has a layer in which a lubricant is added as the outermost layer. Concretely, the coefficient of static friction and the coefficient of dynamic friction are 0.4 or less, and because of the fact that the film is superior in slipping ability, neither wrinkles nor local unevenness is found in extrusion lamination processing or printing.

The drawn film of the present invention has a high melting point despite the fact that it is constituted of a polylactic acid resin. Therefore, it excels in heat resistance from being low heat shrinkage.

From the polylactic acid of the present invention, not only films but also various types of molded articles can be produced by injection molding, extrusion forming, blow molding, and so on. At this time, even if the polylactic acid is melted at 260 to 300° C., thereby fully melting stereocomplex crystals, the resulting molded article is high in efficiency to reform stereocomplex crystals. Therefore, it is possible to form drawn bottles or fibers, and the resulting molded article can have superior properties such as mechanical properties, solvent resistance and gas barrier property, which stereocomplexes have.

EXAMPLES

The present invention is described more concretely with reference to examples, but the invention is not limited these examples. The properties shown in the examples are those measured or evaluated by the following methods.

1. Weight Average Molecular Weight 8 mg of a sample was dissolved in 4 ml of chloroform to prepare a sample solution. Then, the solution was filtered through a 0.2-μm membrane filter, followed by GPC measurement of the resulting sample solution.

Instrument: TOSOH HLC-8220GPC
Column: TSK gel Super Multipore HZ-M X2+TSK gel SuperHZ2000 (TOSOH)
Solvent: chloroform
Flow rate: 0.35 ml/min
Temperature: 40° C.
Detector: RI A molecular weight was calculated in terms of standard polystyrenes.

2. Amount of Remaining Lactide (Wt %)

A sample was dissolved in chloroform D, and the amount of remaining lactide was calculated from the ratio of the integral value of the protons originating in a polylactic acid to the integral value of the protons originating in the remaining lactide obtained by using a 400 MHz nuclear magnetic resonance spectrometer (NMR).

3. Glass Transition Temperature Tg (° C.)

Measurement was conducted in accordance with JIS K7122. By using a differential scanning calorimeter, model DSC-60 manufactured by Shimadzu Corporation, about 10.0 mg of a sample was prepared and measured within the range of 30° C. to 280° C. at a temperature raising rate of 20° C./min, so that a DSC curve was obtained. The temperature of the point of inflection due to glass transition was read from it.

4. Melting Point Tm (° C.)

Measurement was conducted in accordance with JIS K7122. By using a differential scanning calorimeter, model DSC-60 manufactured by Shimadzu Corporation, about 10.0 mg of a sample was prepared and measured within the range of 30° C. to 280° C. at a temperature raising rate of 20° C./min, so that a DSC curve was obtained. The melting peak temperature was read from it.

5. Enthalpy of Fusion (ΔHm) for No Application of Treatment at 280° C.

Measurement was conducted in accordance with JIS K7122. By using a differential scanning calorimeter, model DSC-60 manufactured by Shimadzu Corporation, about 10.0 mg of a sample was prepared and measured within the range of 30° C. to 280° C. at a temperature raising rate of 20° C./min, so that a DSC curve was obtained. The enthalpy of fusion of a stereocomplex was determined from the resulting curve.

6. Enthalpy of Fusion (ΔHm) after Raising Temperature to 280° C. and Rapidly Cooling Measurement was conducted in accordance with JIS K7122. By using a differential scanning calorimeter, model DSC-60 manufactured by Shimadzu Corporation, about 10.0 mg of a sample was prepared and its temperature was raised to 280° C. and then maintained for 3 minutes. Then, the sample was taken out and it was immersed in liquid nitrogen for 5 minutes. Subsequently, the sample was picked out from the liquid nitrogen and it was left at rest at room temperature for 10 minutes. Then, it was measured within the range of from 30 to 330° C. at a temperature raising rate of 20° C./min, and from the resulting curve was determined the enthalpy of fusion of a stereocomplex.

7. Mechanical Properties (Elastic Modulus, Strength at Break)

Measurement was conducted in accordance with JIS K7113. A sample 10 mm in width and 100 mm in length along the longitudinal direction and the transverse direction of a film, respectively, was cut out with a razor, and the cut piece was used as a sample. Measurement was performed under conditions including a distance between chucks of 40 mm and a drawing rate of 200 mm/min, and the average of five measurements was used. As a measuring instrument, an Autograph AG5000A manufactured by Shimadzu Corporation was used.

8. Dimensional Change (Degree of Heat Shrinkage)

The test was performed in accordance with the method for testing dimensional change provided in JIS C2318 except for adjusting the testing temperature to 150° C. and the heating time to 30 minutes.

9. Transparency Test

A haze value was measured by using a haze meter manufactured by Toyo Seiki Seisaku-sho, Ltd. in accordance with JIS K6714.

Production Example 1

Production of PLLA

A 2-L reaction vessel made of SUS304 equipped with a stirrer, a thermometer, and a nitrogen inlet was charged with 5000 g of L-lactide, and the lactide was melted at a temperature of 120° C. under stirring under a nitrogen atmosphere. Then, 1.4 g of tin octylate, 5.0 g of ethylene glycol as an initiator, and 2.9 g of trimethyl phosphate were added. The weight average molecular weight of the lactide at the time of its addition was 500 or less. Then, the temperature was raised to 180° C. and polymerization was carried out for 1.5 hours. Then, the pressure was held at a reduced pressure of 0.1 Torr for 0.5 hours to prepare a polylactic acid (PLLA-1). The weight average molecular weight of the resulting resin was 171,000 and the amount of remaining lactide was 1.1%.

Production Example 2

Production of PDLA

A polylactic acid resin (PDLA-1) was obtained by carrying out polymerization similarly except for using D-lactide instead of L-lactic acid. The weight average molecular weight of the resulting resin was 163,000 and the amount of remaining lactide was 1.3%.

Example 1

Using a melt pressing machine set at 200° C., PLLA-1 was sandwiched between Teflon (registered trademark) sheets, pressed and held for 3 minutes, and then rapidly cooled with cold water, so that a sheet with a thickness of 100 μm was obtained. A sheet of PDLA-2 was also produced in a similar way. These sheets including five of each type were stacked alternately and pressed at 200° C., so that a 200-μm thick sheet having 10 layers was obtained. In the same method, ten-layer sheets, ten sheets in total, were produced and these sheets were stacked so that PLLA-1 would contact with PDLA-1, and then they were pressed at 200° C., so that a 100-μm thick sheet having 100 layers was obtained. In the same method, ten-layer sheets, ten sheets in total, were produced and these sheets were stacked in a similar manner so that PLLA-1 would contact with PDLA-1, and then they were pressed at 230° C., so that a 100-μm thick sheet having a theoretical number of layers of 100 was obtained. In the same method, 100-layer sheets, ten sheets in total, were produced and these sheets were stacked in a similar manner so that PLLA-1 would contact with PDLA-1, and then they were pressed at 280° C., so that a 100-μm thick sheet having a theoretical number of layers of 1000 was obtained. The thickness of each layer was calculated to be 0.1 μm. This sheet was pressed and then rapidly cooled with cold water, so that an amorphous sheet was obtained. When this sheet was measured by DSC with a temperature raising rate of 20° C./min, the Tg was 52° C. and no crystallization peaks of the PLLA and the PDLA were observed. The PLLA and the PDLA had a melting point of 167° C. and a ΔHm of 4.1 J/g. The stereocomplex PLA had a Tm of 233° C. and a ΔHm of 74.5 J/g. When this was heated to 280° C., then cooled rapidly with liquid nitrogen, and measured at a temperature raising rate of 20° C./min again, the PLLA and the PDLA had a Tm of 166° C. and a ΔHm of 16.6 J/g. The stereocomplex PLA had a Tm of 223° C. and a ΔHm of 69 J/g. Hence, a stereocomplex was formed efficiently in the elevation of temperature during the DSC measurement.

Comparative Example 1

Using a melt pressing machine set at 200° C., PLLA-1 was sandwiched between Teflon (registered trademark) sheets, pressed and held for 3 minutes, and then rapidly cooled with cold water, so that a sheet with a thickness of 100 μm was obtained. A sheet of PDLA-1 was also produced in a similar way. These sheets including five of each type were stacked alternately and pressed at 280° C., so that a 100-μm thick sheet having 10 layers was obtained. The thickness of each layer was calculated to be 10 μm. When this sheet was measured by DSC with a temperature raising rate of 20° C./min, the Tg was 52° C. and the crystallization peaks of the PLLA and the PDLA were 103° C. and 123° C., respectively. The PLLA and the PDLA had a melting point of 167° C. and a ΔHm of 23.3 J/g. The stereocomplex PLA had a Tm of 221° C. and a ΔHm of 25.1 J/g. When this was heated to 280° C., then cooled rapidly with liquid nitrogen, and measured at a temperature raising rate of 20° C./min again, the PLLA and the PDLA had a Tm of 170° C. and a ΔHm of 23.9 J/g. The stereocomplex PLA had a Tm of 222° C. and a ΔHm of 34.1 J/g. The efficiency of stereocomplex formation was low.

Examples 2 to 5, Comparative Examples 2 and 3

Sheets were prepared in the same manner as that used in Example 1, except for partly changing conditions. The results are shown in Table 1.

Example 6

The PLLA resin described in Production Example 1 and the PDLA described in Production Example 2 were vacuum dried separately at 100° C. overnight, and their pellets were fed to two extruders. The pellets were melted at 220° C. and PLLA and PDLA were stacked by using a 16-element static mixer with a temperature gradient of 200/240/280° C. from the inlet toward the outlet of the static mixer. Then, a strand was cooled with water to solidify and cut to afford pellets. Physical properties of the resulting resin composition are shown in Table 1.

Comparative Example 4

The PLLA resin described in Production Example 1 and the PDLA described in Production Example 2 were vacuum dried separately at 100° C. overnight, and pellets of the respective resins were blended in a weight ratio of 50/50 and fed into a single screw extruder having barrel temperatures of 150/200/280° C. and L/D=30 (dimension ratio). Melting and mixing were conducted in the extruder, and then a strand was cooled with water to solidify and cut to afford pellets. Physical properties of the resulting resin composition are shown in Table 1.

Example 7

The rapidly cooled sheet with a theoretical number of layers of 1000 obtained in Example 1 was cut into a length of 40 mm and a width of 50 mm, fixed to a hand-rotated drawer with a distance between chucks of 20 mm. Then, it was preliminarily heated in a hot air oven of 85° C. for 3 minutes and uniaxially drawn to 2.5 times at a deformation rate of 500%/min. This was then drawn at the same temperature, the same rate, and the same ratio to a direction of 90° with respect to that of the uniaxial drawing. The biaxially drawn sample was heat set in an oven of 100° C. while being fixed, so that a biaxially drawn film was obtained. The resulting film was transparent. In dynamic viscoelasticity measurement, lowering of elastic modulus was not observed in a region of from 80 to 180° C. and the elastic modulus lowering temperature was 190° C.; hence, heat resistance was improved greatly in comparison to biaxially drawn films of only ordinary PLLA or PDLA.

Comparative Example 5

The rapidly cooled sheet with a theoretical number of layers of 100 obtained in Comparative Example 1 was cut into a length of 40 mm and a width of 50 mm, fixed to a hand-rotated drawer with a distance between chucks of 20 mm. Then, it was preliminarily heated in a hot air oven of 85° C. for 3 minutes and uniaxially drawn to 2.5 times at a deformation rate of 500%/min. This was then drawn at the same temperature, the same rate, and the same ratio to a direction of 90° with respect to that of the uniaxial drawing. The biaxially drawn sample was heat set in an oven of 180° C. while being fixed, so that a biaxially drawn film was obtained. The resulting film was transparent. In dynamic viscoelasticity measurement, great fall of elastic modulus near 160° C. was observed and it had only heat resistance equivalent to biaxially drawn films of only ordinary PLLA or PDLA.

Example 8

Using a melt pressing machine set at 200° C., PLLA-1 was sandwiched between Teflon (registered trademark) sheets, pressed and held for 3 minutes, and then rapidly cooled with cold water, so that a sheet with a thickness of 100 µm was obtained. A sheet of PDLA-2 was also produced in a similar way. These sheets including five of each type were stacked alternately and pressed at 200° C., so that a 200-µm thick sheet having 10 layers was obtained. In the same method, ten-layer sheets, ten sheets in total, were produced and these sheets were stacked so that PLLA-1 would contact with PDLA-1, and then they were pressed at 200° C., so that a 100-µm thick sheet having 100 layers was obtained. In the same method, ten-layer sheets, ten sheets in total, were produced and these sheets were stacked in a similar manner so that PLLA-1 would contact with PDLA-1, and then they were pressed at 230° C., so that a 100-µm thick sheet having a theoretical number of layers of 100 was obtained. In the same method, 100-layer sheets, ten sheets in total, were produced and these sheets were stacked in a similar manner so that PLLA-1 would contact with PDLA-1, and then they were pressed at 250° C., so that a 100-µm thick sheet having a theoretical number of layers of 1000 was obtained. The thickness of each layer was calculated to be 0.1 µm. Like Example 1, this satisfies the present invention as a sheet-formed composition. This sheet was pressed and then cooled rapidly with cold water. This sheet was cut to have a length of 40 mm and a width of 50 mm, fixed to a hand-rotated drawer with a distance between chucks of 20 mm. Then, it was preliminarily heated in a hot air oven of 85° C. for 3 minutes and uniaxially drawn to 2.5 times at a deformation rate of 500%/min. However, rupture was observed at a draw ratio of 1.5 times or more, resulting in failure in drawing. This result explains that it is meant that the resin compositions of the inventions described as the first and the second provided above are heated to a temperature of 280° C. or higher before conducting processing such as converting into a drawn film, thereby once melting stereocomplex crystals (the invention described in the third).

Example 9

The PLLA resin described in Production Example 1 and the PDLA described in Production Example 2 were vacuum dried separately at 100° C. overnight, and their pellets were fed to two extruders. The pellets were melted at 220° C. and PLLA and PDLA were stacked by using an 18-element static mixer with a temperature gradient of 200/240/280° C. from the inlet toward the outlet of the static mixer, extruded through a T-shaped die heated to 280° C., and cooled to solidify into a sheet form by using a cooling roll adjusted to 20° C., so that a multilayer undrawn sheet was produced. The ratio of the discharge amounts of the two extruders was adjusted to 1:1. The thickness of the undrawn sheet was 200 µm. This sheet had a Tg of 55° C. and a melting point of 232° C. This sheet was subjected to a preheating treatment at a temperature of 75° C. first and then subjected to MD drawing to 3.5 times at a drawing temperature of 85° C. and a distortion rate of 5000%/min. This sheet was subsequently introduced to a tenter continuously, then subjected to TD drawing to 3.5 times in a post-heating zone of 85° C. and a drawing zone of 85° C., further subjected to thermal fixation at 180° C. and transverse relaxation in 3%, then cooled, and further subjected to trimming of both edge portions, so that a 15-nm thick biaxially drawn stereocomplex PLA resin film was obtained. The film properties at this time are shown in Table 1.

Comparative Example 6

The PLLA resin described in Production Example 1 and the PDLA described in Production Example 2 were vacuum dried separately at 100° C. overnight, and the two kinds of pellets were blended in a weight ratio of 50/50, kneaded at 220° C. in an extruder, extruded through a T-shaped die of 220° C., and cooled to solidify into a sheet form by using a cooling roll adjusted to 20° C., so that an undrawn sheet was produced. The thickness of the undrawn sheet was 200 nm. By DSC measurement, it was found that this sheet had a Tg of 55° C. and a melting point on a higher temperature side of 216° C. After the measurement, the sample was held at 280° C. for 5 minutes and then measured again under rapid cooling; the melting point on the higher temperature side was 189° C. This result reproduces the result of non-patent document 1 cited in this description, and it was found that the presently inventeD-formation of multiple layers is an essential factor for the purpose of maintaining the melting point of a stereocomplex crystal. The above-described sheet was subjected to a preheating treatment at a temperature of 75° C. and then subjected to MD drawing to 3.5 times at a drawing temperature of 85° C. and a distortion rate of 5000%/min. This sheet was subsequently introduced to a tenter continuously and then subjected to TD drawing to 3.5 times in a post-heating zone of 85° C. and a drawing zone of 85° C. The film was melted by thermal fixation at 180° C. and a film superior in heat resistance could not be obtained.

Example 10

The PLLA resin described in Production Example 1 and the PDLA described in Production Example 2 were vacuum dried separately at 100° C. overnight, and their pellets to which 3% by weight of a polyamide elastomer resin (Pebax4033 produced by ARKEMA) had been added were fed to two extruders. The pellets were melted at 220° C. and PLLA and PDLA were stacked by using a 12-element static mixer with a temperature gradient of 200/240/280° C. from the inlet toward the outlet of the static mixer, extruded through a T-shaped die heated to 280° C., and cooled to solidify into a sheet form by using a cooling roll adjusted to 20° C., so that a multilayer undrawn sheet was produced. The ratio of the discharge amounts of the two extruders was adjusted to 1:1. The thickness of the undrawn sheet was 250 μm. By the addition of the polyamide elastomer resin, the pollution of the chilled roll in melt-casting was greatly suppressed. This sheet had a Tg of 55° C. and a melting point of 222° C. This sheet was subjected to a preheating treatment at a temperature of 75° C. first and then subjected to MD drawing to 4 times at a drawing temperature of 85° C. and a distortion rate of 7000%/min. This sheet was subsequently introduced to a tenter continuously, then subjected to TD drawing to 4 times in a post-heating zone of 85° C. and a drawing zone of 90° C., further subjected to thermal fixation at 180° C. and transverse relaxation in 3%, then cooled, and further subjected to trimming of both edge portions, so that a 15-μm thick biaxially drawn stereocomplex PLA resin film was obtained. The film properties at this time are shown in Table 1. The resulting film was superior also in pinhole resistance.

Example 11

A commercially available PLLA (Lacea H100 produced by Mitsui Chemicals, Inc.) and the PDLA described in Production Example 2 were vacuum dried separately at 100° C. overnight, and their pellets were fed to two extruders. After melting them at 220° C., the PLLA and the PDLA were stacked by using a 4-element static mixer of 220° C. This was made pass through a multilayer feed block having 256 layers with a temperature gradient of from 250 to 280° C. from the inlet toward the out let, thereby being stacked into about 4000 layers, and this was extruded through a T-shaped die heated to 280° C., and cooled to solidify into a sheet form by using a cooling roll adjusted to 35° C., so that a multilayer undrawn sheet was produced. The ratio of the discharge amounts of the two extruders was adjusted to 1:1. The thickness of the undrawn sheet was 400 μm. This sheet had a Tg of 55° C. and a melting point of 229° C. This sheet was subjected to a preheating treatment at a temperature of 80° C. first and then subjected to MD drawing to 3.5 times at a drawing temperature of 85° C. and a distortion rate of 7000%/min. This sheet was subsequently introduced to a tenter continuously, then subjected to TD drawing to 3.5 times in a post-heating zone of 85° C. and a drawing zone of 90° C., further subjected to thermal fixation at 180° C. and transverse relaxation in 3%, then cooled, and further subjected to trimming of both edge portions, so that a 30-μm thick biaxially drawn stereocomplex PLA resin film was obtained. The film properties are shown in Table 1.

Example 12

The PLLA resin described in Production Example 1 and the PDLA described in Production Example 2 were vacuum dried separately at 100° C. overnight, and fed to two extruders. An item prepared by melting at 220° C. and stacking PLLA and PDLA by using a 10-element static mixer with a temperature gradient of 200/240/280° C. from the inlet toward the outlet of the static mixer was placed on both skin layer sides of a three-layer feed block. A resin prepared by mixing the PLLA and an aliphatic aromatic polyester resin (ECOFLEX, produced by BASF) in a weight ratio of 50/50 was used as a resin of the core layer side, so that a two-kind, three-layer constitution of A/B/A type (thickness ratio: 25/50/25) was produced. This was extruded through a T-shaped die heated to 280° C., and cooled to solidify into a sheet form by using a cooling roll adjusted to 20° C., so that a multilayer undrawn sheet was produced. The ratio of the discharge amounts of the PLLA and the PDLA was adjusted to 1:1. The thickness of the undrawn sheet was 250 μm, wherein the skin layers were each 50 μm thick. The Tg and the melting point of the skin layer sides of this sheet were 55° C. and 224° C., respectively. This sheet was subjected to a preheating treatment at a temperature of 75° C. first and then subjected to MD drawing to 4 times at a drawing temperature of 85° C. and a distortion rate of 7000%/min. This sheet was subsequently introduced to a tenter continuously, then subjected to TD drawing to 4 times in a post-heating zone of 85° C. and a drawing zone of 90° C., further subjected to thermal fixation at 180° C. and transverse relaxation in 3%, then cooled, and further subjected to trimming of both edge portions, so that a 15-μm thick biaxially drawn stereocomplex PLA resin film was obtained. The film properties at this time are shown in Table 1. By introducing the above-mentioned layer into a core layer, pinhole resistance was improved greatly.

TABLE 1

|  |  | Example 1 | Comparative Example 1 | Example 2 | Example 3 | Example 4 | Example 5 | Comparative Example 2 | Comparative Example 3 | Example 6 | Comparative Example 4 |
|---|---|---|---|---|---|---|---|---|---|---|---|
| L-form content in PLLA | [%] | 99.5 | 99.5 | 99.5 | 99.5 | 99.5 | 99.5 | 99.5 | 99.5 | 99.5 | 99.5 |
| D-form content in PDLA | [%] | 99.5 | 99.5 | 99.5 | 99.5 | 99.5 | 99.5 | 99.5 | 99.5 | 99.5 | 99.5 |
| Other component in PLLA layer (L layer) |  | — | — | — | — | — | — | — | — | — | — |
| Other component in PDLA layer (D layer) |  | — | — | — | — | — | — | — | — | — | — |
| Other layer |  |  |  |  |  |  |  |  |  |  |  |
| Stacking state of L layer and D layer |  | Stacked alternately | Stacked alternately | Stacked alternately | Stacked alternately | Stacked alternately | Stacked alternately | Stacked alternately | Stacked alternately | Stacked alternately | Mixed |
| Number of total layers |  | 1000 | 10 | 5000 | 200 | 1000 | 1000 | 1000 | 10000 | ≈1000 | — |
| Thickness of L layer:thickness of D layer |  | 50:50 | 50:50 | 50:50 | 50:50 | 42:58 | 65:35 | 20:80 | 50:50 | 50:50 | Mixture ratio 50:50 |
| Thickness of one L layer | [μm] | 0.1 | 10 | 0.02 | 0.5 | 0.08 | 0.13 | 0.04 | 0.001 | ≈0.1 | — |
| Thickness of one D layer | [μm] | 0.1 | 10 | 0.02 | 0.5 | 0.12 | 0.07 | 0.16 | 0.001 | ≈0.1 | — |
| Total thickness of the sheet | [μm] | 100 | 100 | 100 | 100 | 100 | 100 | 100 | 100 | 100 | 100 |
| Heating and rolling method |  | ○ | ○ | ○ | ○ | ○ | ○ | ○ | ○ |  |  |
| Temperature of rolling | [° C.] | 200, 200, 230, 280 | 200, 280 | 200, 200, 230, 250, 280 | 200, 200, 230, 280 | 200, 200, 280 | 200, 200, 230, 265 | 200, 200, 230, 270 | 200, 200, 230, 280 | 200, 200, 230, 280, 280, 280 |  |

TABLE 1-continued

|  |  | | | | | | | | | | |
|---|---|---|---|---|---|---|---|---|---|---|---|
| Static mixer method |  | | | | | | | | | | ○ |
| Number of elements | [—] | | | | | | | | | | 16 |
| Temperature gradient | [° C.] | | | | | | | | | | 220, 200, 240, 280 |
| Feed block method Structure |  | | | | | | | | | | |
| Temperature gradient | [° C.] | | | | | | | | | | |
| Melting and mixing |  | | | | | | | | | | ○ |
| Temperature of mixing | [° C.] | | | | | | | | | | 280 |
| Melting point | [° C.] | 233 | 221 | 229 | 230 | 233 | 233 | 222 | 208 | 232 | 225 |
| Enthalpy of fusion after raising 280° C. and rapidly cooling | [J/g] | 69 | 34.1 | 70.4 | 61.4 | 65.3 | 60.8 | 28.6 | 34.1 | 68.6 | 12.1 |
| Temperature of extruding | [° C.] | | | | | | | | | | |
| Biaxially drawablity |  | | | | | | | | | | |
| Heat resistance of the film |  | | | | | | | | | | |
| Haze value of the film | [%] | 2.4 | 10.3 | 2.3 | 4.3 | 2.9 | 3.3 | 1.9 | 1.2 | 2.2 | 1.1 |

|  |  | Example 7 | Comparative Example 5 | Example 8 | Example 9 | Comparative Example 6 | Example 10 | Example 11 | Example 12 |
|---|---|---|---|---|---|---|---|---|---|
| L-form content in PLLA | [%] | 99.5 | 99.5 | 99.5 | 99.5 | 99.5 | 99.5 | 99.3 | 99.5 |
| D-form content in PDLA | [%] | 99.5 | 99.5 | 99.5 | 99.5 | 99.5 | 99.5 | 99.5 | 99.5 |
| Other component in PLLA layer (L layer) |  | — | — | — | — | — | Pebax4033 3 wt % | — | — |
| Other component in PDLA layer (D layer) |  | — | — | — | — | — | Pebax4033 3 wt % | — | — |
| Other layer |  | | | | | | | | Core layer PLLA + Ecoflex (50/50) |
| Stacking state of L layer and D layer |  | Stacked alternately | Stacked alternately | Stacked alternately | Stacked alternately | Mixed | Stacked alternately | Stacked alternately | Stacked alternately |
| Number of total layers |  | 1000 | 10 | 1000 | ≈1000 | — | ≈1000 | 4000 | ≈1000 |
| Thickness of L layer:thickness of D layer |  | 50:50 | 50:50 | 50:50 | 50:50 | Mixture ratio 50:50 | 50:50 | 50:50 | 50:50 |
| Thickness of one L layer | [μm] | 0.1 | 10 | 0.1 | ≈0.1 | — | ≈0.1 | 0.1 | ≈0.1 |
| Thickness of one D layer | [μm] | 0.1 | 10 | 0.1 | ≈0.1 | — | ≈0.1 | 0.1 | ≈0.1 |
| Total thickness of the sheet | [μm] | 100 | 100 | 100 | 200 | 200 | 250 | 400 | 250 |
| Heating and rolling method |  | ○ | ○ | ○ | | | | | |
| Temperature of rolling | [° C.] | 200, 200, 230, 280 | 200, 280 | 200, 200, 230, 250 | | | | | |
| Static mixer method |  | | | | ○ | | ○ | ○ | ○ |
| Number of elements | [—] | | | | 18 | | 12 | 4 | 10 |
| Temperature gradient | [° C.] | | | | 220, 200, 240, 280 | | 220, 200, 240, 280 | 220 | 220, 240, 280 |
| Feed block method Structure |  | | | | | | | | ○ 4 division 4 times |
| Temperature gradient | [° C.] | | | | | | | | 250, 280 |
| Melting and mixing |  | | | | | ○ | | | |
| Temperature of mixing | [° C.] | | | | | 220 | | | |
| Melting point | [° C.] | 233 | 221 | 233 | 230 | 216 | 228 | 229 | 224 |
| Enthalpy of fusion after raising 280° C. and rapidly cooling | [J/g] | 69 | 34.1 | 69 | 69.8 | 12.1 | 60.4 | 64.9 | 62.1 |
| Temperature of extruding | [° C.] | | | | 280 | 220 | 280 | 280 | 280 |
| Biaxially drawablity |  | ○ | Δ | X | ○ | Δ | ○ | ○ | ○ |
| Heat resistance of the film |  | ○ | X | — | ○ | X | ○ | ○ | ○ |
| Haze value of the film | [%] | 0.8 | 14.3 | — | 1.4 | 18.2 | 3.1 | 1.1 | 2.9 |

INDUSTRIAL APPLICABILITY

The polylactic acid resin disclosed in the present invention and the polylactic acid film obtained therefrom are capable of being used at higher temperatures in comparison with a usual polylactic acid resin and polylactic acid resin film, superior in various processabilities such as printability and in appearance such as transparency, high in productivity, and high in industrial usefulness. They can be used suitably as industrial materials such as molding materials as well as materials for wrapping foods, pharmaceuticals, sundry goods, and the like.

The invention claimed is:

1. A polylactic acid resin composition, comprising a resin composition (l) primarily including a poly-L-lactic acid having an L-form content of 90 to 100 mol % and a resin composition (d) primarily including a poly-D-lactic acid having a D-form content of 90 to 100 mol %, the resin compositions (l) and (d) being stacked alternately one on another with (l) and (d) each being 0.01 to 2.5 μm in a single layer thickness, wherein a peak of a melting point is observed at 210° C. or higher in DSC measurement using a 10 mg sample, and an enthalpy of fusion is measured to be 60 J/g or more when the sample is heated to 280° C., held for 3 minutes, then immediately cooled rapidly, and further subjected to DSC measurement at a temperature raising rate of 20° C. per minute.

2. The polylactic acid resin composition according to claim 1, wherein the resin composition (l) and the resin composition (d) are stacked alternately one on another by making them pass a static mixer or a multilayer feed block.

3. A polylactic acid resin drawn film produced by using the polylactic acid resin composition according to claim 1 or 2, heating it to 280° C. or higher, then cooling it rapidly, and then drawing it in at least one direction.

* * * * *